May 22, 1956 — C. J. BILLIAN — 2,746,193
DECORATING GLASSWARE BY HIGH ENERGY RADIATION
Filed Aug. 18, 1954
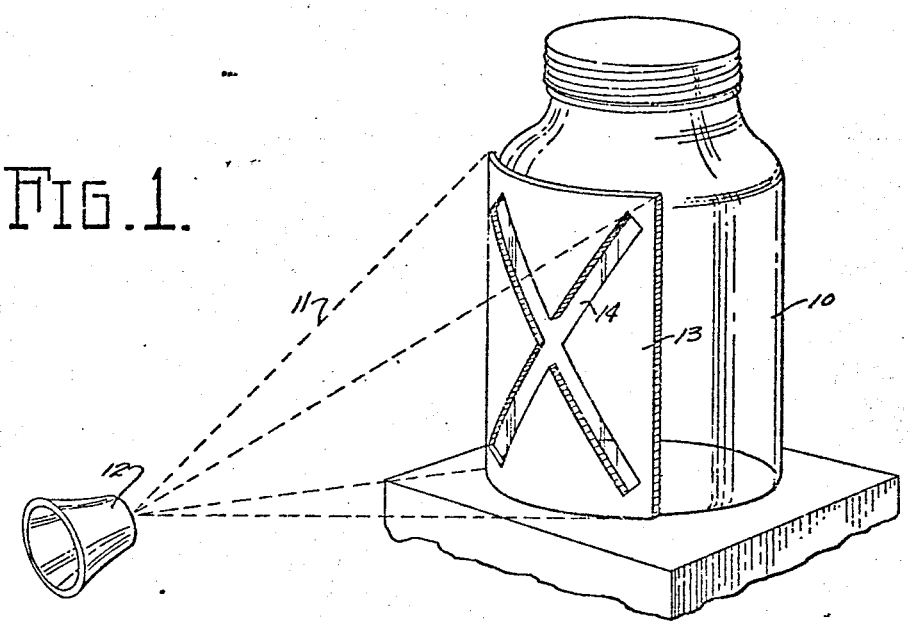
FIG. 1.
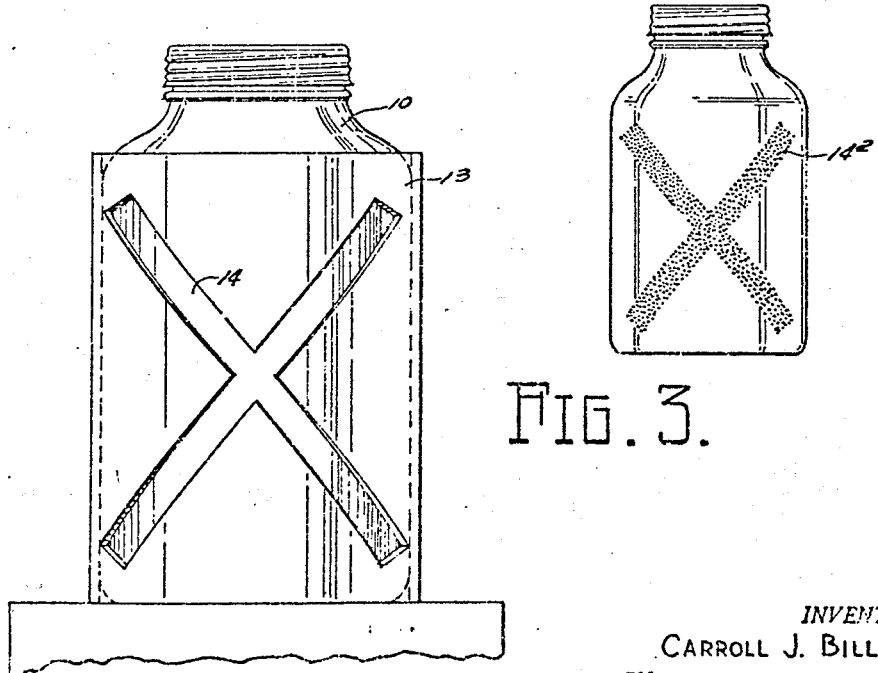
FIG. 2.
FIG. 3.
INVENTOR.
CARROLL J. BILLIAN

United States Patent Office 2,746,193
Patented May 22, 1956

2,746,193

DECORATING GLASSWARE BY HIGH ENERGY RADIATION

Carroll J. Billian, Toledo, Ohio, assignor to Owens-Illinois Glass Company, a corporation of Ohio Application August 18, 1954, Serial No. 450,748

8 Claims. (Cl. 41—17)

My invention relates to methods and means for utilizing high energy radiation for coloring and decorating glassware and for other purposes. When certain types of glass are subjected to high energy radiation such as cathode rays or bombarded with high velocity electrons, the clear glass turns into an amber or brown color. In accordance with the present invention this phenomenon is utilized for decorating glassware. An article such as a glass jar, for example, is decorated with a color design by cutting or stenciling the design in a mask, such as a sheet of lead, which is placed over the surface to be decorated and is then subjected to the radiation. The portion of the glass outlined by the stenciled design is thus exposed to the radiation and assumes a characteristic amber or brown color. This provides a method for quickly decorating, printing or applying such a design to the glassware without requiring any further treatment. Operations, such as heating, drying, baking or curing, required in usual methods of decorating or printing on such glassware, are eliminated.

The high energy radiation may also be employed for sterilizing a glass container and its contents when packed with a food product or other material. The entire package is subjected to the radiation which penetrates the glass, sterilizes the contents of the container and gives to the glass a characteristic color which serves the purpose of indicating that the product has been sterilized in this manner.

My invention provides a method and means of coloring a wide variety of flint glass compositions by means of high velocity cathode rays. These include the flint glasses in general commercial use in the manufacture of glass containers, such as bottles and jars, drinking glass and numerous other articles. The amount of color produced varies to some degree with the base composition of the glass, but the presence or absence of any given major oxide used in commercial glass practice does not prevent coloration.

Ceric oxide can be used for minimizing and effectively preventing coloration in flint glass. Ceric oxide contents of about 1 per cent effectively prevent coloration in soda-lime silica and borosilicate commercial compositions, although the amounts necessary are slightly different for these two glasses.

Referring to the accompanying drawings which illustrate a method of practicing the present invention:

Fig. 1 is a perspective view showing a glass container being subjected to high energy radiation;

Fig. 2 is an elevational view of a container and a mask with a design positioned in front of the container; and Fig. 3 is a view of the container with the color design.

Referring to Fig. 1, a container 10, shown as a glass jar, is subjected to a cathode ray beam 11 or an electronic bombardment. The radiation of the beam 11 may be from any suitable point or element 12. A mask 13 consisting of sheet lead or other material impenetrable by the radiation, is applied to the exterior surface of the container 10, being interposed between the radiation source and the container 10. A design 14 is cut or stenciled in the shield 13 so that the surface portion of the glass exposed to the radiation is of the same design. The effect of the radiation is to change the exposed glass to a characteristic amber or brown color. This result is obtained by an exposure of comparatively short duration which may be about ten seconds. With this short time exposure the radiation and consequent coloring effect penetrates only the surface portion or a short distance beneath the surface as for example two or three-sixteenths of an inch. As shown in Fig. 2 the mask 13, interposed between the jar 10 and the source of radiation, is of a width greater than that of the jar, thus fully protecting the latter during exposure of the design 14 to the radiation. Fig. 3 illustrates the portion 14ª of the glass colored in accordance with the design.

If desired, an additional shield of sheet lead or the like may be placed within the container in position to shield the far side of the container, thus preventing the radiation being carried through the design to the opposite wall of the container.

The source of high energy radiation should be a pressure insulated electrostatic generator of the belt type, preferably rated at three million volts constant potential. The glass article 10 should be exposed and oriented in such a fashion that the entire area which is to be colored is sprayed with electrons. This area should be directly exposed to the electron beam while the portions of the container which are to remain clear are masked with the lead foil 13 which is of a thickness to exclude any incident energy. This material should be at least .100" thick to totally exclude all radiation. Other materials such as iron may be used but a greater thickness is needed. The depth of penetration of the emerging cathode rays is determined by the voltage and by the density of the absorbing material, while the area which is irradiated can be controlled by selection of window absorber distances, by magnetic deflection, and by suitable masking or scattering arrangements.

The ware 10 under treatment should preferably receive an average dose in depth of $3 \times 10^6$ Roentgen equivalents-physical (REP). This quantity of ionization is obtained by setting the generator to deliver three million electron volt (m. e. v.) monoenergetic electrons at a rate of $3 \times 10^5$ REP per second for a total of ten seconds. Some of the kinetic energy of the electrons is converted into X-rays but the percentage is so small that one may conclude that the coloration is in no way associated with the X-radiation.

With limitation only as to thickness, cathode rays can penetrate through any type of material including glass, metal and plastics. Their penetration depends both on the electron voltage and the density of the irradiated material. Two million volt electrons have a maximum range in water of one centimeter and an effective range of about two-thirds this value. Since the range increases directly with voltage, three million volt electrons will adequately treat to a depth of ⅜" in water, or similar materials, and to somewhat more than ¾" if the products are solid and can be irradiated from both sides. This latter figure holds true for typical flint glass containers. The exact depth of penetration will vary somewhat with major oxide changes but can be considered a fair approximation for flint container compositions now in use.

The decoration may be applied to the container in the manner above described either while the container is empty or after it has been packed with any desired commodity. The present invention further contemplates the use of the high energy radiation for sterilizing the container and its contents when the container has been packed with any desired food product or other commodity and sealed. In this instance the entire container may be subjected to the radiation for a length of time sufficient to cause penetration of the container walls and the contents of the container, thus sterilizing the package. The change in color of the container during this sterilizing process serves as a convenient and practical means to indicate that the package has undergone such a sterilizing treatment. The sterilized container may also be supplied with a design 14 by additional treatment with the electron radiation in the manner above described.

The present invention is characterized by the use of high velocity electrons supplied from a source of ionizing radiation rather than any mono-chromatic radiation such as X-rays and the like.

The coloration of ware as produced by high energy radiation may be only temporary if desired. The coloration resultant in a flint container composition can be made to disappear completely if the glass is heated at 500° F. for one hour. Temperatures as low as 200° F. result in decided bleaching. This phenomenon is reversible; that is, the coloration and subsequent thermal fading can be repeated at will.

Modifications may be resorted to within the spirit and scope of my invention.

I claim:

1. The method of printing or decorating a glass article which comprises directing high energy radiation toward the surface of the article, interpositioning between said surface and the source of radiation a mask having cut or stenciled therein a design, and causing the design to be applied to the glass by coloration or change in color of a surface portion of the glass exposed through the design in the mask.

2. The method of applying a surface decoration of predetermined design to a glass article which comprises directing high energy radiation toward a surface of the article, interposing between said surface and the source of radiation a mask having cut therein the said design and thereby coloring the surface portion of the glass exposed to said radiation.

3. The method defined in claim 2, the mask consisting of a lead foil of at least about .100" in thickness.

4. The method defined in claim 2, the potential of said radiation being within the range of about two million to three million volts.

5. The method defined in claim 4, the length of time of exposure of said surface to the radiation being about ten seconds.

6. The method of temporarily coloring a surface portion of glass which comprises directing against said surface high energy radiation and thereby coloring said surface, and thereafter heating said surface to a temperature of not less than about 500° F. for a length of time not less than about one hour and thereby causing the color to disappear.

7. The method which comprises directing against the portion of a surface portion of the glass having a predetermined design, high energy radiation of the order of three million volts for a length of time not less than about ten seconds and thereby coloring the surface portion of the glass exposed to said radiation, and thereafter heating said surface portion to a temperature of about 500° F. for at least about one hour and thereby causing said color to disappear.

8. The method defined in claim 7, which includes repeatedly coloring the glass and removing the color in alternation by alternate exposure of the glass to the said radiation and to heating at said temperature.

References Cited in the file of this patent

UNITED STATES PATENTS 2,628,160     Stookey  --------------- Feb. 10, 1953

OTHER REFERENCES

Summer, November 1952 issue of Manufacturing Chemist, pp. 451–455.